United States Patent

Cannon

[15] 3,663,749

[45] May 16, 1972

[54] SLOW SCAN VIDEO METHOD AND SYSTEM

[72] Inventor: Max R. Cannon, Boulder, Colo.

[73] Assignee: International Business Machines Corporation, Armonk, N.Y.

[22] Filed: Nov. 24, 1969

[21] Appl. No.: 879,165

[52] U.S. Cl. ..........178/6.8, 178/DIG. 3
[51] Int. Cl. ..........H04n 7/12
[58] Field of Search..........178/6, 6.8, DIG. 3; 179/2 TV

[56] References Cited

UNITED STATES PATENTS

| | | | |
|---|---|---|---|
| 3,021,384 | 2/1962 | Brown | 179/2 TV |
| 3,284,567 | 11/1966 | Southworth | 178/DIG. 3 |
| 3,372,228 | 3/1968 | Law | 178/DIG. 3 |
| 3,453,382 | 7/1969 | Bockwoldt et al. | 178/DIG. 3 |
| 3,453,383 | 7/1969 | Schafer | 178/DIG. 3 |
| 3,470,313 | 9/1969 | Bockwoldt | 178/DIG. 3 |

*Primary Examiner*—Robert L. Griffin
*Assistant Examiner*—Richard K. Eckert, Jr.
*Attorney*—Reilly & Lewis

[57] ABSTRACT

A digital slow scan video conversion method and system for wide band composite video signals generated by a television camera including an encoder with sampling means to progressively sample instantaneous amplitudes of the video signal, and a digital timer generates digital timing pulses quantitized in time in discrete steps relative to the wide band signal frequency to regulate the sampling for producing digital sampling pulses which form a narrow band signal that may be recorded on magnetic tape or transmitted over lines such as telephone lines. A decoder includes a disc-type storage medium storing or recording the digital sampling pulses in series, and a second digital timer generates digital timing pulses to regulate sequence and position of storage of the sampling pulses so as to gradually assemble the sampling pulses in the proper relation over a longer time interval for subsequent readout. Pulse width modulation of the narrow band video signal prior to storage improves the image detail, and pulse code modulation prior to storage provides for a totally digital form of video conversion to afford accurate timing between sampling and reproducing positions of the sampling pulses.

10 Claims, 12 Drawing Figures

INVENTOR
MAX R. CANNON
BY
[signature]
ATTORNEYS

Patented May 16, 1972 3,663,749

5 Sheets-Sheet 3

SLOW SCAN VIDEO METHOD AND SYSTEM

This invention relates to improvements in the processing of video signals and more particularly to a novel and improved slow scan conversion method and system.

Narrow band composite video signals are utilized where stationary images are recorded on a restricted band width information channel. The most commonly used techniques for generating narrow band composite video signals involve (1) the slow readout of a special camera tube or (2) the sampling and holding of discrete image elements in a predetermined pattern or relationship. The present invention is directed to improved means for accomplishing the second technique, specifically through utilization of digital timing pulses, as opposed to analog techniques. Presently known sample and hold slow scan video systems generally suffer two shortcomings: (1) poor timing between the samples or discrete image elements in the reproducer stage relative to the sampling stage and (2) poor quality of the narrow band signal applied to the storage media. The first problem is caused by timing differences between a sampling stage and a reproducing stage. The second is due to circumferential variations which result in recording of amplitude modulated signals on a storage media such as a magnetic disc.

Accordingly, it is an object of this invention to provide a slow scan video method and system whereby the position of each sample in the sampling stage is accurately correlated with respect to position and time with that of the reproducer stage decoder so as to avoid any timing or position differences therebetween.

Another object of this invention is to provide for the pulse width modulation of the narrow band composite video signals and also composite video-audio signals prior to recording on a storage disc or like storage media.

Another object of this invention is to provide a fully digitized slow scan conversion system characterized in that master clock digital timing pulses are applied at the same rates for timing both the sampling and reproducing stages.

It is yet a further object of this invention to provide a slow scan conversion system readily adapted either for black and white or color video signals.

Still a further object of this invention is to provide a slow scan system which facilitates accurate transmission of the signals generated over a conventional transmission line or facilitates their recording on a magnetic tape.

Briefly stated, in accordance with the present invention, the foregoing is accomplished in an improved slow scan conversion method and system including sampling means for progressively sampling instantaneous amplitudes of a wide band composite video signal and a digital timer or clock to generate digital timing pulses quantitized in time in discrete steps relative to the frequency of the video signal to regulate the sampling to produce a succession of digital sampling pulses representing image elements positioned accurately in place in time. A decoder includes a disc-type storage medium serially storing the sampling pulses and digital timing pulses correlated with those of the sampling regulate the storage time sequence so as to accurately correlate the sampling and reproduction position of each sampling pulse. The image detail is increased by a pulse width modulating the narrow band video signal before recording or storing, and the timing accuracy is improved by pulse code modulating the digital sampling pulses which form the narrow band video signal portions prior to recording on a storage media.

The foregoing and other objects, features and advantages of the invention will be apparent from the following more particular description of preferred embodiments of the invention, as illustrated in the accompanying drawings.

A wide band composite video signal or television signal typically comprises a video signal portion for each line of a camera frame which has the actual image content together with horizontal and vertical sync and blanking signal portions for each line and vertical signal portions during the vertical interval which establish correct position for the video signal portion for each line during transmission and reproduction. The conventional television signal has a band width of approximately 4 MHz with a frame rate of 30 frames per second and 525 lines per frame. The term "frame" as used herein refers to a single traversal by the electron beam of all the scanning lines on a television screen so that the wide band composite video signal has a video signal portion for each line in each of a succession of frames. The six sample per line technique described hereafter reduces the band width to a 47,250 Hz signal which may be recorded on most instrumentation type tape recorders. The number of samples per line may vary from one or more and for example two samples per line produce a 15,750 KHz signal which may be recorded on many audio tape recorders.

Figure 1:
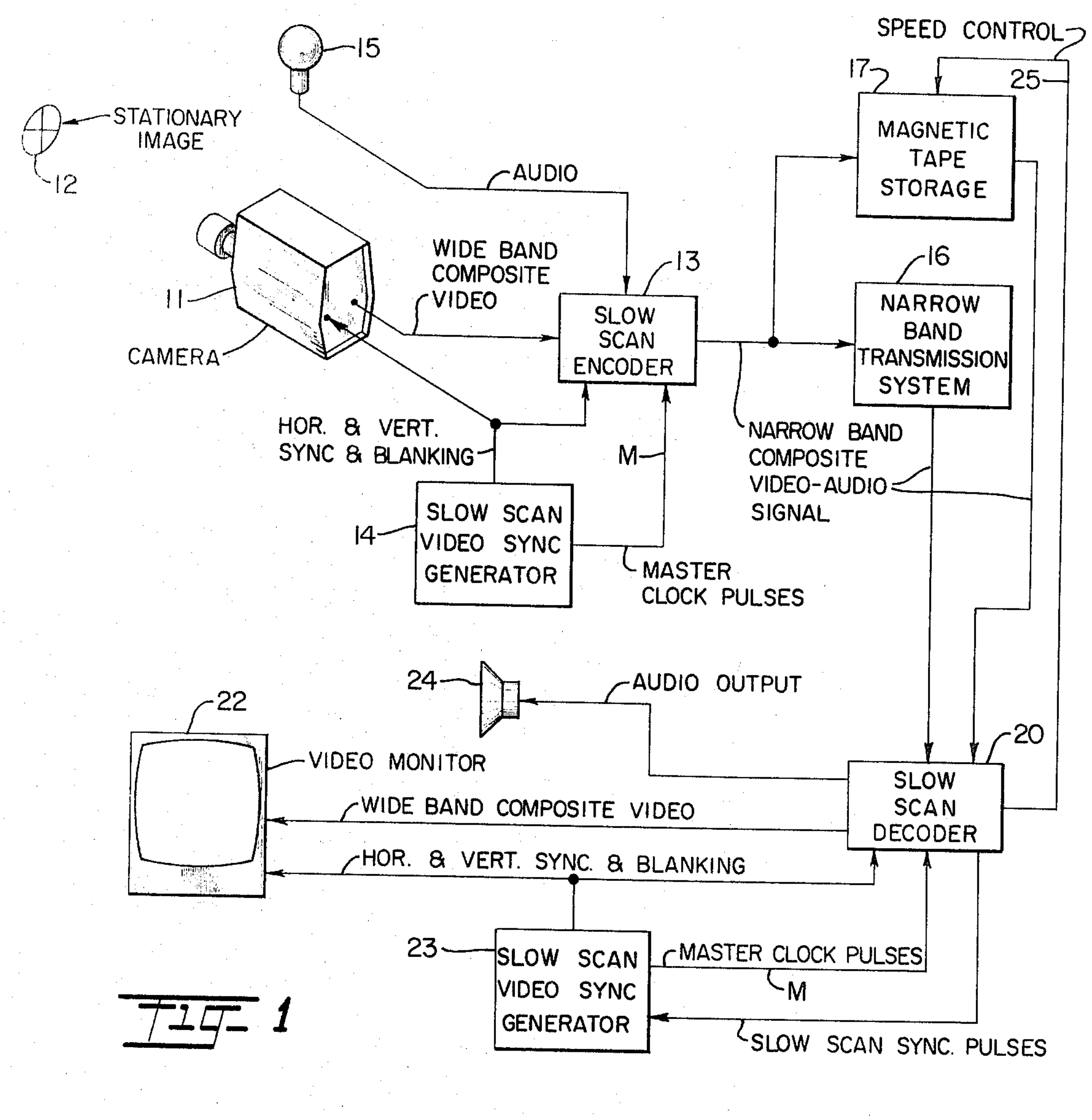
FIG. 1 is a schematic block diagram of a video system embodying features of the present invention.

Referring now to FIG. 1 there is shown a video system which, broadly stated, comprises a conventional television camera 11 scanning a stationary image 12 to generate a wide band composite video signal. An encoder 13 includes means to progressively sample different amplitudes of the incoming wide band composite video signal to produce a succession of sampling pulses each representing an image element to form a narrow band video signal. A slow scan video sync generator 14 provides timing for the system shown in the form of horizontal and vertical sync and blanking pulses for the camera 11 and for the encoder 13 together with master clock timing pulses M for the encoder. It is understood, however, that the horizontal and vertical sync and blanking pulses for the camera may be provided from another source. In the encoder 13 the horizontal and vertical sync and blanking pulses are replaced by slow scan sync pulses during each vertical interval. An audio source represented at 15 is shown to provide an audio input signal to the encoder 13. The encoder combines the narrow band video signal portion, slow scan sync pulses and audio signals to produce what is herein referred to as a narrow band composite video-audio signal. The narrow band composite video-audio signal may either be transmitted over a narrow band transmission system 16 such as a telephone line or recorded on a magnetic tape storage 17 or like storage media.

The narrow band composite video-audio signal is converted back to the original wide band composite video signal by a slow scan decoder 20, and the wide band composite video signal at the output of the decoder may be applied to a video monitor 22 for a visual display of the original image. Another slow scan video sync generator 23 having the same outputs as the first-mentioned sync generator 14 provides the timing for the video monitor 22 and the decoder 20. The decoder 20 includes means to serially store the sampling pulses representing image elements over a longer time duration than the frame interval and gradually assembles them in their correct sequence for a continuous playback at the original wide band rates. In the decoder the slow scan sync pulses are replaced by the horizontal and vertical sync and blanking pulses in their proper sequence relative to the video signal portion for each line. The audio signal portion is stripped off in the decoder and may be converted to sound in a speaker 24. In the event the narrow band composite video-audio signal is first recorded on a magnetic tape storage 17, a speed control represented as an output over line 25 is provided from the decoder to the magnetic tape storage 17 to synchronize the timing of the recording on the tape 17 with that of the decoder 20.

Figure 2:
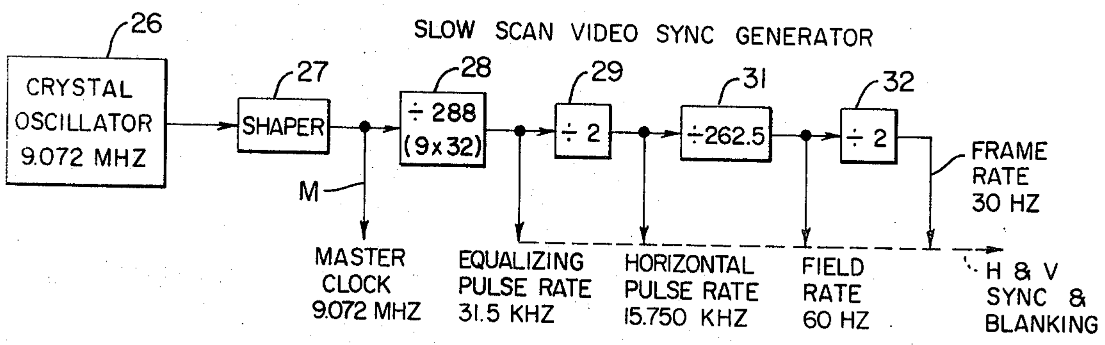
FIG. 2 is a more detailed block diagram of the video sync generator for the video system shown in FIG. 1.

For the purpose of illustration the frequencies for the slow scan video sync generators 14 and 23 will now be described with reference to FIG. 2 for a conventional television signal considering a total of 576 samples per line at a rate of six samples per line which will have a band width of 4.53 MHz. The video sync generators are identical and each comprises a crystal oscillator 26 which produces a 9.072 MHz output which is approximately twice the frequency of the wide band signal. The output of the crystal oscillator is sinusoidal and only the positive portions are converted by a shaper 27 to digital timing pulses or a digital pulse train quantitized in time in discrete steps relative to the frequency of the video signal and recur at a fixed rate which are hereinafter referred to as master clock timing pulses M. A frequency divider 28 divides the master clock pulses by 288 to establish equalizing pulses which are at a rate of 31.5 KHz. A frequency divider 29 divides the equalizing pulses by 2 to establish horizontal rate pulses at the rate of 15.750 KHz. A frequency divider 31 divides the horizontal rate pulses by 262.5 to establish field rate pulses at the rate of 60 Hz and a final frequency divider 32 divides the field rate pulses by 2 to provide the frame rate pulses at the rate of 30 Hz. These output pulses with the exception of the master clock timing pulses are herein referred to as the horizontal and vertical sync and blanking pulses.

A table of typical master clock oscillator frequencies for different numbers of samples is listed below:

TABLE I

| Master Clock Freq. (MHz) | Video Band Width (MHz) | Initial Frequency Division |
|---|---|---|
| 10.080 | **5.040** | **320** |
| 9.450 | **4.725** | **300** |
| 9.072 | **4.536** | **288** |
| 8.442 | **4.221** | **268** |
| 8.064 | **4.032** | **256** |
| 7.560 | **3.780** | **240** |
| 7.056 | **3.528** | **224** |
| 6.300 | **3.150** | **200** |

| Horizontal Image Elements | Total Samples Per Line |
|---|---|
| 528 | **640** |
| 495 | **600** |
| 475 | **576** |
| 442 | **536** |
| 422 | **512** |
| 396 | **480** |
| 370 | **448** |
| 330 | **400** |

WHERE:

(1) Master clock frequency 2 × video band width (2) Initial frequency division is an integer (3) Master clock frequency = 31.5 × initial frequency division (4) Horizontal image elements = Active horizontal line time × Master clock frequency = 52.39 × Master clock frequency

Figure 3:
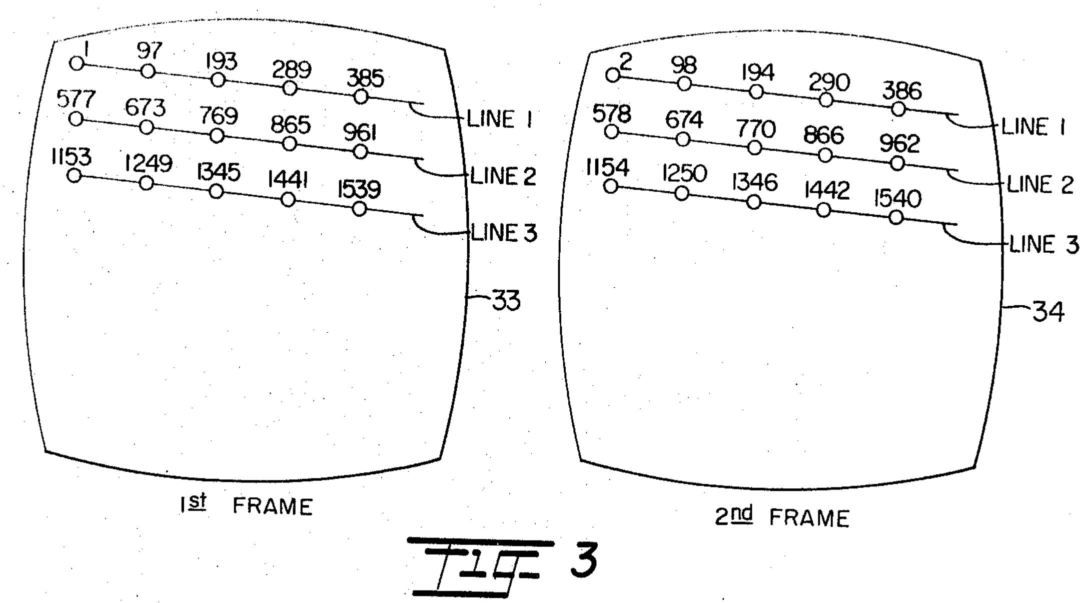
FIG. 3 is a schematic illustration of the raster for several lines for the first two frames showing the relative positions in time of successive samples on the same lines.
Figure 4:
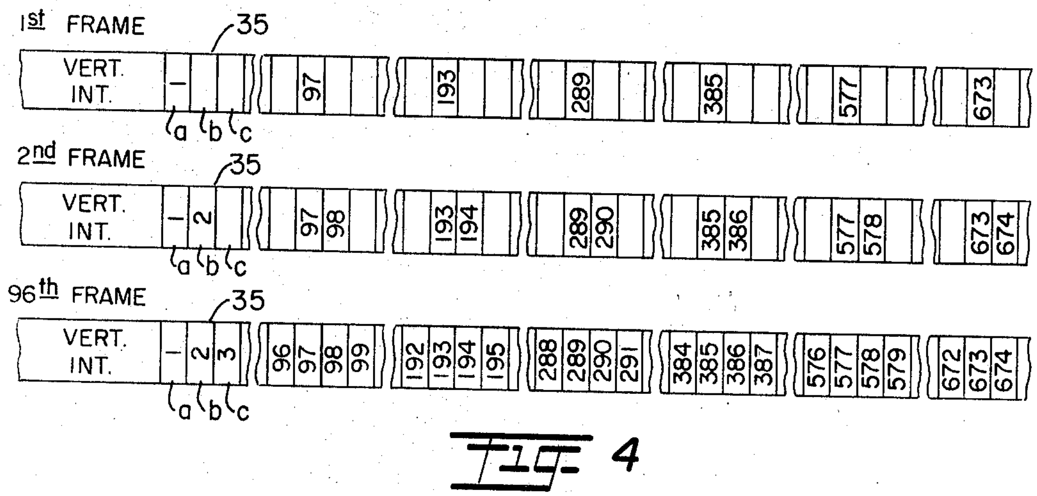
FIG. 4 is a schematic fragmentary view of the storage disc on which the sampling pulses representing image elements are stored.

(5) Total samples per line = ½ Initial frequency division (6) Slow scan video band width = Sampling rate (Number of samples for each line)/ (Total samples per line) × Wide band video band width The digital sampling and recording technique of the encoder 13 and decoder 20 may be best understood with reference to FIG. 3 showing a typical raster with the first two frames designated 33 and 34, respectively, and FIG. 4 showing fragments of a storage disc 35 corresponding with the first, second, and 96th frames. The sampling and recording technique illustrated in FIGS. 3 and 4 illustrates only how the video signal is stored and not the audio signal. Due to the high speeds of the video signal it comes from the encoder in a scrambled form and must be assembled in the proper order on the storage medium in the decoder. The audio signals are at lower rates and do not require the cell storage techniques. The audio signals are timed to be transmitted or recorded during the vertical interval in place of the sync and blanking pulses. Consecutive numerals beginning with 1 are used to designate the related point in time or locations of each sample for each line, for the cells of the storage disc and for the master clock timing pulses. Sampled video signal amplitudes representing image elements 1, 97, 193, 289, and 385 are shown in FIG. 3 as being taken from line 1, but sample 481 does not appear since it occurs during the horizontal blanking interval. These samples are thus taken beginning at the left side of the line and are taken at equal intervals of 96 which is established by the master clock timing pulses as described hereinafter. In turn, samples 577, 673, 769, 865, and 961 are taken from line 2 with each being directly under one of the samples of the first line and this sampling progresses in the same way at equal intervals of 96 until all of the lines of the raster have been sampled.

The storage disc 35 is divided into a series of discrete cells *a*, *b*, *c*, etc., the width of each being identical and having enough cells to store all of the samples. The storage disc 35 is progressively in series loaded at the same rate and in the same sequence as the sampling with an a time interval corresponding to 96 cells between elements so that for a first pass or loading of the disc corresponding with the first frame interval, samples 1, 97, 193, 289, 385, etc. are loaded into the first cell, 97th cell, 193rd cell, 289th cell, etc. During the second pass corresponding with the second frame, the 2nd, 98th, 194th, 290th, 386th, etc. cells are filled so that at the end of the 96th frame all the cells on the storage disc are filled and arranged so that the samples on the storage disc will be in their correct sequence when the storage disc is played back or read out, and the playback is continuous except for the sync and blanking intervals.

Figure 5:
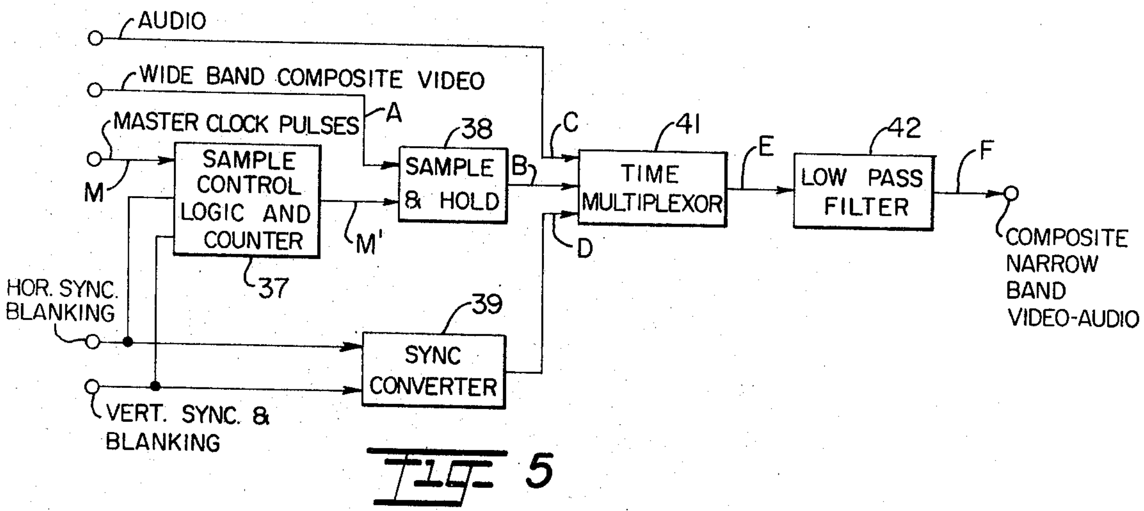
FIG. 5 is a more detailed block diagram of the encoder shown in FIG. 1.
Figure 6:
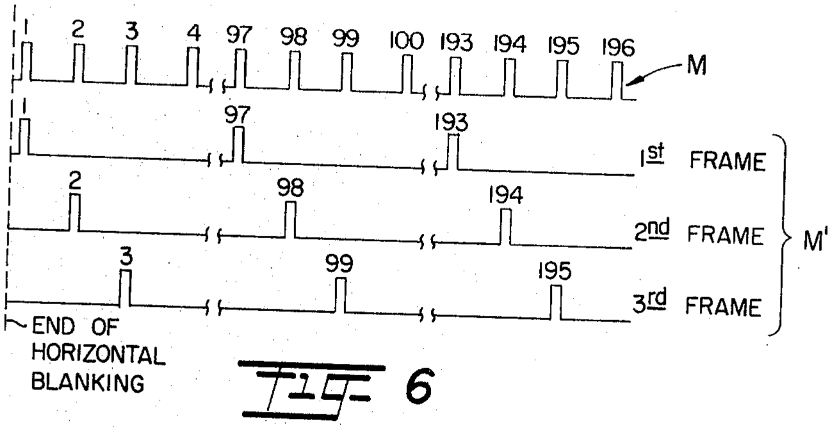
FIG. 6 shows typical schematic waveforms of the master clock timing pulses and the related gated timing pulses from the sample control logic and counter circuit.

Referring now to FIG. 5, the slow scan encoder 13 is shown in more detail to comprise a sample control logic and counter circuit 37 having the successive master clock digital timing pulses M applied as an input thereto, and the horizontal and vertical sync and blanking pulses from the sync generator are also applied as inputs to circuit 37 to establish system timing. The sample control logic and counter circuit 37 employs conventional digital techniques in the nature of sample logic and counter circuits to accurately count the timing pulses and frames and may include as for example a control logic which receives the master clock pulses and controls a frame counter which counts each frame together with a sample pulse counter which counts by 96. The outputs of the comparator frame counter and sample pulse counter may then be compared in a comparator which gates a pulse as an output when the counts of the two counters are equal. As above noted, the master clock timing pulses M are quantitized in time in discrete steps relative to the frequency of the video signal and recur at a fixed rate so that they may be represented as a train or succession of successively numbered pulses, as shown in FIG. 6, and numbered consecutively from 1–196 etc. By counting the timing pulses and the frames in the logic and counter circuit 37 as above described it is possible to advance one pulse for each successive frame to and including pulse 96 and thereby progress over the video signal portion for each line until all of the samples have been taken. For example, with reference to FIG. 6, for frame 1 timing pulses 1, 97, 193, etc. are gated from circuit 37, for frame 2 timing pulses 2, 98, 194, etc. are gated and for frame 3 timing pulses 3, 99, 196, etc. are gated and this progresses through pulse 96 for 96 frames.

Figure 7:
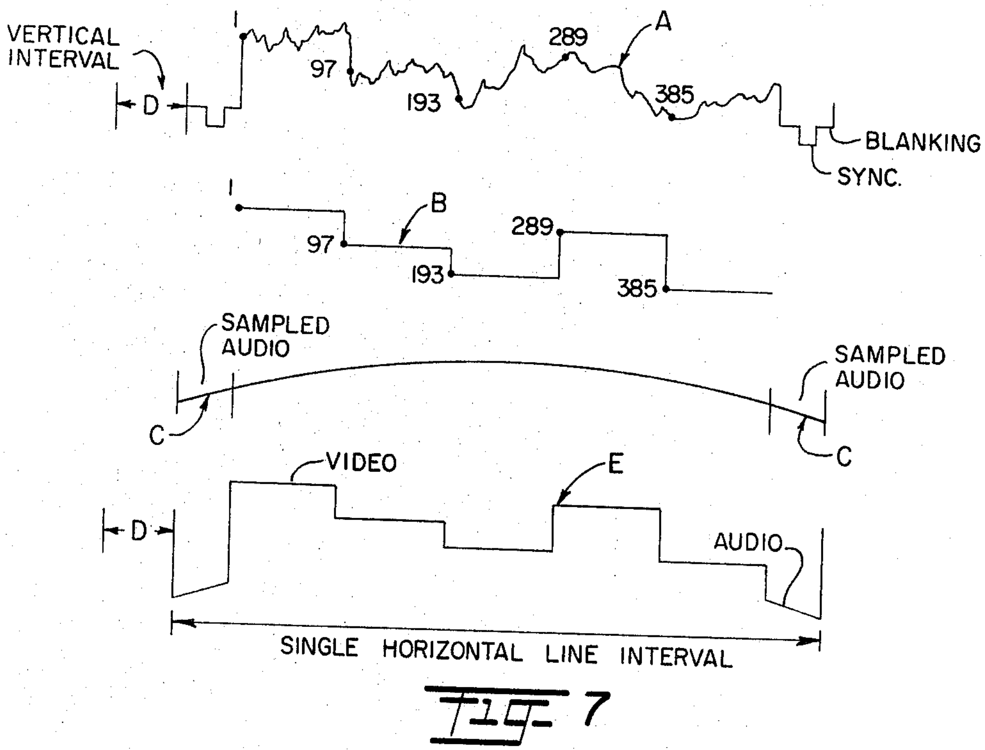
FIG. 7 shows typical schematic wave forms of the circuitry of the slow scan encoder of FIG. 5.

A sample and hold circuit 38 receives the timing pulses in the sequence above-described from said circuit 37 and also receives the wide band composite video signal from the camera 11 and in general functions to progressively sample instantaneous amplitudes of the video signal in a sequence established by the timing pulses. One video signal portion A of the composite video signal for the first line is shown in FIG. 7. Typically a blanking pulse signal portion occurs at the end of each video portion and a sync pulse is superimposed on each blanking pulse.

In the time sequence beginning with the first frame the first or number one digital timing pulse as represented in FIG. 6 will initiate a first sample in the sample and hold circuit which is represented as an instantaneous amplitude of the video portion A of the signal in FIG. 7. The sample and hold circuit in response to the first timing pulse holds this instantaneous amplitude for a fixed duration until the 96th timing pulse initiates a second sample causing the sample and hold circuit to sample another instantaneous amplitude of the video signal A and hold that amplitude until the third timing pulse numbered 193 initiates another in the sample and hold circuit 38 and this continues for the remainder of the first line interval and then repeats for each succeeding line. The result or output from the sample and hold circuit for each line is a succession of digital sampling pulses B, each representing an image element which is positioned accurately at a point in time which together form a narrow band video signal.

The sync converter circuit 39 receives the horizontal and vertical sync and blanking pulses from the sync generator and generates a series of slow scan sync pulses D in place thereof. Pulses D are in the form of notch and pedestal pulses which occur in the normal video signal range and are used to establish field and color information. Each sync pulse burst occurs every 1/60th second and can be clamped at the sync pulse tip at a whiter than white level. The audio signals at the horizontal line rate occur between the sync pulses and are at the blacker than black level and may be used to operate an automatic gain control amplifier if desired.

Figure 8:
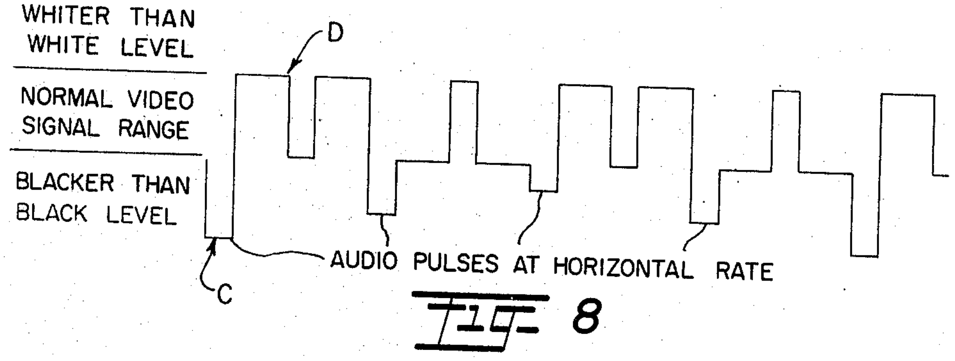
FIG. 8 shows a typical schematic view of waveform of slow scan sync pulses which occur during the vertical interval shown in FIG. 7.

As shown in FIG. 5, a time multiplexor circuit 41 combines the wave forms B, C, and D of FIG. 7 and the resultant output is a narrow band composite video-audio signal with the audio occurring at the leading and trailing end portions of the video for each line and the slow scan sync pulses and audio occurring during the vertical interval, as best seen from FIGS. 7 and 8. The audio signal portion is time multiplexed in the multiplexor so that the incoming audio is sampled 15,570 times each second. The composite video-audio signal E at the output of multiplexor 41 is passed through a low pass filter 42 and converted to a sinusoidal waveform for subsequent transmission and recording purposes. The resultant narrow band composite video-audio signal F has a band width which facilitates its being sent over lower quality transmission lines or its being magnetically recorded.

Figure 9:
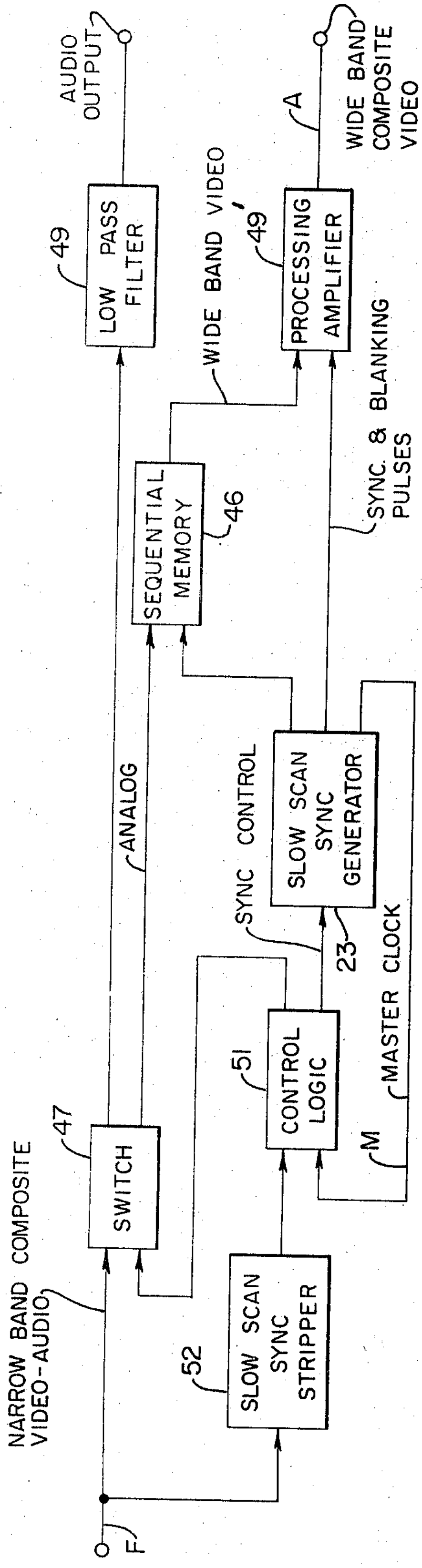
FIG. 9 is a more detailed schematic block diagram of the decoder of FIG. 1.

Referring now to FIG. 9, the decoder 20 includes a sequential memory 46 and a switch 47. This memory 46 may be a storage CRT, or some form of auxiliary buffer, which will receive the composite video-audio signal F and store the sampling pulses representing image elements, as above-described relative to FIG. 4, until they are in their original sequence and then deliver them out at the original wide band rate. The switch 47 in the circuit ahead of the memory 46 is timed to separate the audio from the video from the incoming composite video-audio signal, the separated audio being passed through a low pass filter 49. While audio is included in the system shown to illustrate the advantages thereof, it is understood that the system may process video only but there are distinct advantages in being able to carry both on a composite signal for many applications.

The slow scan sync generator 23 delivers the digital timing pulses M to the sequential memory 46, horizontal and vertical sync pulses to a processing amplifier 49' and master clock timing pulses M to a control logic circuit 51. A slow scan sync stripper 52 receives the composite signal F and gates selected timing pulses to the control logic 51. The control logic 51 has an output to switch 47 and an output to sync generator 23 and through the processing amplifier 49 functions to remove the slow scan sync pulses and add the wide band horizontal sync and blanking pulses in their correct sequence to the output from the memory 46 so that the output of the amplifier 49 is a wide band composite video signal of the same shape as waveform A represented in FIG. 7 for the first line. The control logic 51 in the decoder includes the same type of simple logic and counter circuits as in circuit 37 of the encoder to count frames and timing pulses so as to control the input to memory 46 so that the recording is accurately correlated or synchronized with the sampling.

Figure 10:
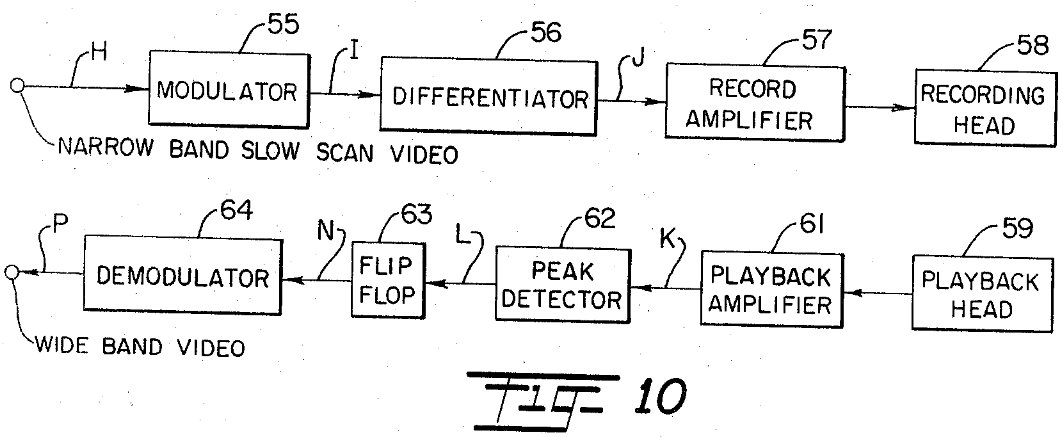
FIG. 10 is a schematic block diagram of a system for pulse width modulating and recording the narrow band video signals.
Figure 11:
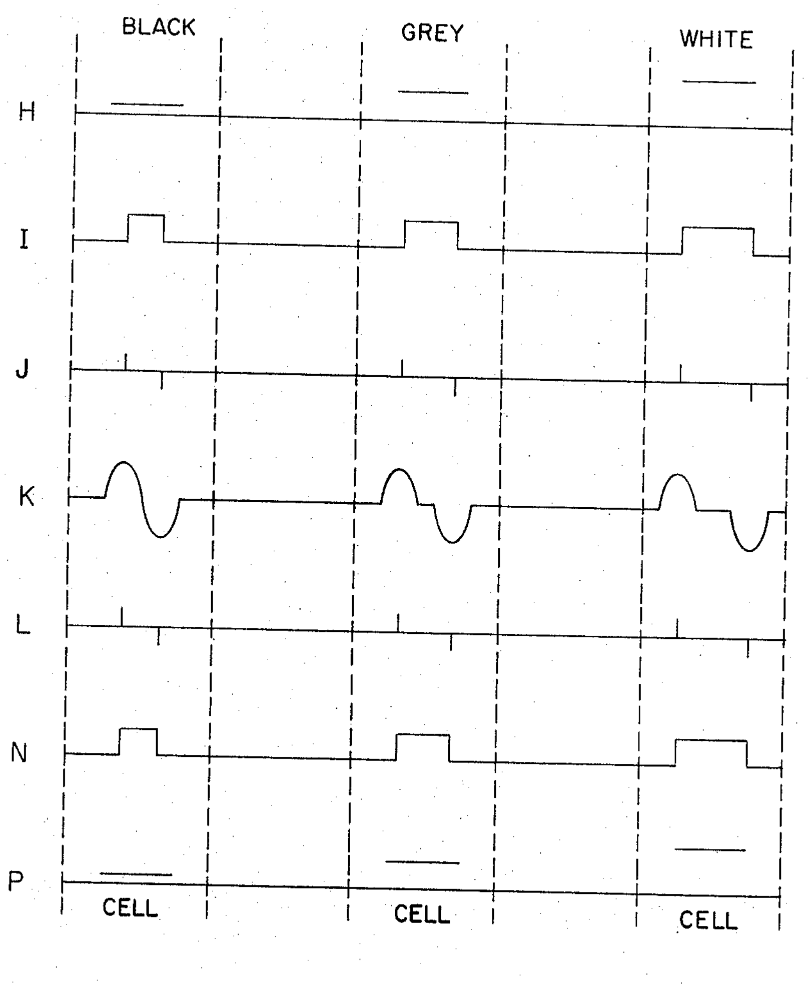
FIG. 11 shows typical schematic waveforms for the system of FIG. 10.

Referring now to FIGS. 10 and 11, there is shown a narrow band video signal recording system whereby a narrow band video signal produced in the conversion system as above described may be recorded on a magnetic storage disc using pulse width modulation techniques. An incoming narrow band composite video signal designated H will have different amplitudes representing the different intensity levels of black, gray, and white. A modulator 55 pulse width modulates the narrow band video signal H so that the width of the resulting signal I is proportional to the amplitude. A differentiator 56 then changes the pulses I to positive and negative peaks J having the same duration between the peaks as that of the corresponding pulses I. A record amplifier 57 amplifies the waveforms to the extent necessary so that they may be recorded on the storage disc after being picked by a recording head 58 and then may be stored in discrete cells on the storage disc.

In the retrieval sequence, a playback head 59 delivers recorded signals to a playback amplifier 61, the output being positive and negative-going sinusoidal waveforms K. A peak detector 62 limits the sinusoidal waveforms to positive and negative-going peaks L which are similar to waveforms J. A flip-flop 62 changes the waveform L to pulses N corresponding to original pulses I and the demodulator 64 changes the pulses back to the original waveforms P having amplitudes corresponding to the pulse widths. A magnetic disc will provide a convenient storage buffer for the analog video signals. The vestigial sideband FM technique generally used for video recording cannot be used because of the manner in which the picture is reassembled on the disc. Pulse width modulation has the advantage of being relatively insensitive to disc amplitude variations. The digital video signals may use other buffers or memories such as magnetic cores or solid state delay line memories. The principle is the same regardless of the specific buffer configurations. Each sampling pulse representing an image element is allocated an individual cell within the memory as is controlled by the master clock pulses. A digital system such as that described provides any desired degree of band width reduction together with reduced geometric distortion and picture noise. In the above-referred to system relative to FIGS. 1 through 8 each image element is represented as a pulse and is stored in a cell in the reproducer memory.

Figure 12:
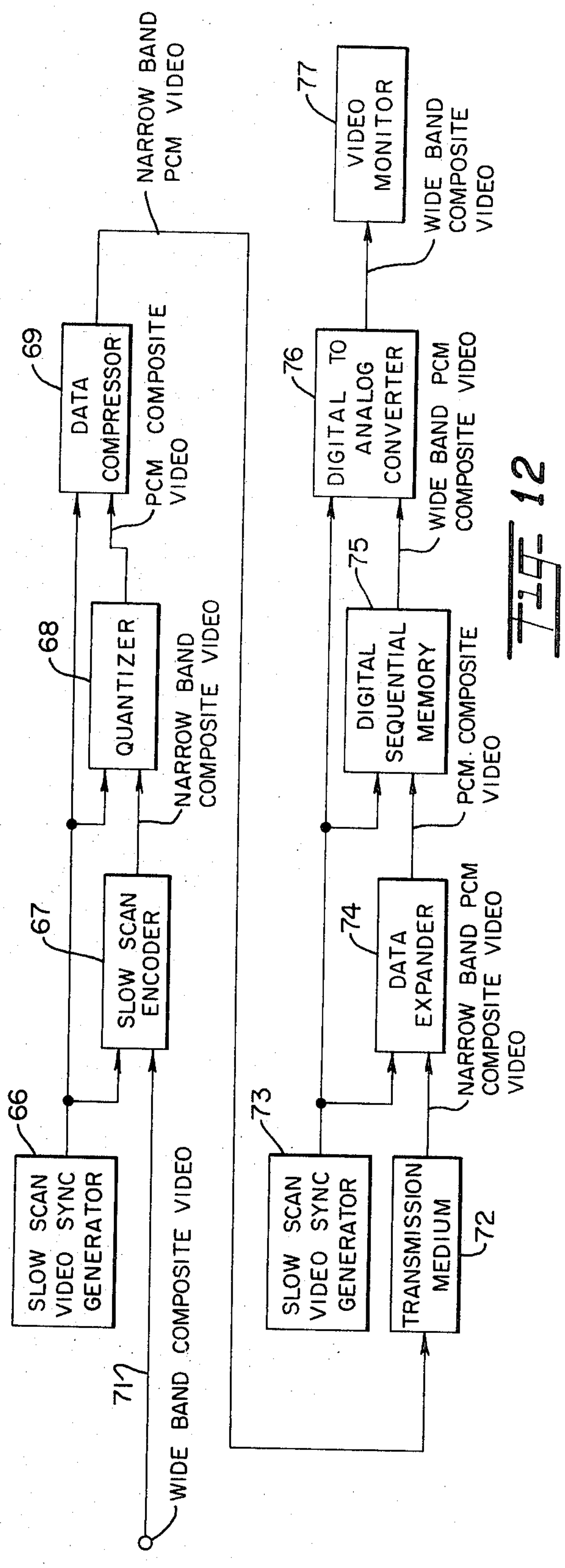
FIG. 12 is a schematic block diagram of a fully digital video processing system.

In FIG. 12 there is shown an all-digital video method and system using pulse code modulation techniques whereby a group of the digital sampling pulses is coded to represent a single image element to produce a high quality picture. Because of the redundancy of most video images some modulated compression is generally possible. For most typical images it is possible to achieve a compressed pulse code modulated digital signal with about the same band width as the uncompressed analog signal. The signal-to-noise ratio of the pulse code modulated system is much better than the analog system particularly when the signal is passed through a noisy channel such as a low-cost telephone line. FIG. 12 shows a typical block diagram of a video signal processor using pulse code modulating techniques. A slow scan video sync generator 66 provides the system timing including the master clock pulses, digital timing pulses quantitized in time relative to the frequency of the wide band signal for the slow scan encoder 67, a quantitizer 68 and a data compressor 69. A wide band composite video signal is applied into the encoder 67 wherein it is converted into a narrow band composite video signal in the same manner as above-described relative to encoder 13 and the quantitizer 68 codes it into a pulse code modulated composite video signal which is then compressed in a data compressor 69 so that the output of the data compressor 69 is a narrow band, pulse code modulated composite video signal. A transmission medium 72 will then transfer this composite signal into the reproducer stage which again includes a slow scan video sync generator 73 which provides the timing for a data expander 74, a digital sequential memory 75 and a digital to analog converter 76 to establish synchronism between the sampling and reproducing stages for each sampling pulse representing an image element. The narrow band PCM composite video signal is delivered into the data expander where it is converted into a pulse code modulated composite video signal which is stored on the digital sequential memory 75. A playback or payout of the memory 75 produces a wide band PCM composite video signal which is then converted from the digital form back to the analog form in the converter 76 for display on the video monitor 77. The major advantage of the fully digital video signal is its freedom from noise. Even multiple transmission over telephone lines, through tape recorders or data processing systems does not decrease the signal-to-noise ratio. The slow scan technique in this invention may be used with either digital or analog video signals but digital signals are preferred for many applications.

Color video pictures may also be converted to slow scan in accordance with the present invention. The conventional color encoding (such as NTSC, PAL or SECAM) is not needed. Each primary color image element is sampled as previously described. Field or frame sequential sampling may be used. The entire red frame may be sampled, after which the green frame is sampled, followed by the blue frame. This technique permits the use of an inexpensive monochrome camera to generate color pictures. An appropriate colored filter is placed in the optical path to the camera for each of the sequential scan periods.

A color camera with R–G–B output may be used in an interleaved sequential sample technique. Considering the six-sample-per-line technique previously described, the first sample might be red (R1), the second sample green (G97), the third sample blue (B193) and so on. The first line samples would then be R1, G97, B193, R289, G385, sync and blanking and audio signal portions. The second line samples would be B1, R97, G193, B289, R385, etc. After 288 frames or 9.6 seconds, all picture elements in all three colored frames will be sampled. This technique has an advantage such that when the narrow band signal is recorded on magnetic tape any tape "-dropout" is almost unnoticeable. In a conventional video tape recorder, a "dropout" causes a loss of video signal over a portion or all of a horizontal line. The visible result is a horizontal white or black flash. Dropouts can be quite objectionable if they occur frequently. The same type of dropout on a slow scan tape recorder produces a series of shorter vertical lines. For example, the six-sample-per-line system would have five vertical dropout lines of one-sixth the length of a conventional horizontal dropout lines. In an interleaved sequential sample color system the vertical dropout lines still occur, but they are not very objectionable because a different color is missing on each successive horizontal line. The top of the vertical dropout line may contain only blue and green color components, the red being lost because of the dropout. The horizontal line below this dropout spot is normal because it was sampled at a later time, due to the interlaced scan. The next horizontal line would have the red and blue components, but the green would be missing. Every other horizontal line contains a small spot where one of the three color elements is missing, but the missing colors are alternated. The result is hardly noticeable for most pictures.

While the invention has been particularly shown and described with reference to preferred and alternate embodiments thereof, it will be understood by those skilled in the art that various changes in form and details may be made without departing from the spirit and scope of the invention.

What is claimed is:

1. A digital slow scan conversion system for a wide band composite video signal generated by a camera scanning an image comprising:
   an encoder including sampling means for progressively sampling instantaneous amplitudes of the video signal,
   first digital timing means for said encoder including a first sync generator generating first digital timing pulses quantitized in time in discrete steps relative to the frequency of the wide band composite video signal and recurring at a fixed rate to regulate the sampling rate of said encoder for the production of a succession of digital sample pulses at the output of said encoder each representing an image element positioned accurately at a point in time to form a narrow band composite video signal,
   a decoder coupled to said encoder including a storage medium storing the digital sample pulses, second digital timing means coupled to said decoder including a second sync generator separate from said first sync generator generating second digital timing pulses at a rate correlated with the rate of said digital sample pulses to store said digital sample pulses in the decoder in the same sequence as they are sampled by said encoder and over a longer time interval than the camera frame rate for subsequent readout at the original wide band rates, and means between said encoder and decoder to pulse width modulate the narrow band composite video signal before storing it on said storage medium.

2. A digital slow scan conversion system for a wide band composite video signal generated by a camera scanning an image comprising:
   an encoder including sampling means for progressively sampling instantaneous amplitudes of the video signal,
   first digital timing means said encoder including a first sync generator generating first digital timing pulses quantitized in time in discrete steps relative to the frequency of the wide band composite video signal and recurring at a fixed rate to regulate the sampling rate of said encoder for the production of a succession of digital sample pulses at the output of said encoder each representing an image element positioned accurately at a point in time to form a narrow band composite video signal,
   a decoder coupled to said encoder including a storage medium storing the digital sample pulses, second digital timing means coupled to said decoder including a second sync generator separate from said first sync generator for generating second digital timing pulses at a rate correlated with the rate of said digital sample pulses to store said digital sample pulses in the decoder in the same sequence as they are sampled by said encoder and over a longer time interval than the camera frame rate for subsequent readout at the original wide band rates, and means between said encoder and decoder to pulse code modulate the narrow band composite video signal prior to storing on said narrow band composite signal on said storage medium.

3. A digital slow scan conversion system as set forth in claim 2 wherein said storage medium is of the rotating disc type and successive cells are filled with each revolution of the disc.

4. A digital slow scan conversion system as set forth in claim 2 including a magnetic tape for storing the narrow band composite video signal and speed control means responsive to an output from the decoder to synchronize the timing of the recording on said magnetic tape with that of said decoder for the synchronized playback of the narrow band composite signal from said magnetic tape.

5. A digital slow scan conversion system as set forth in claim 2 wherein said sampling is at the rate of six samples for each line of the wide band composite video signal.

6. A digital slow scan conversion system as set forth in claim 2 including means for storing the narrow band composite video signal on a magnetic tape.

7. A digital slow scan conversion system as set forth in claim 2 including means coupled to said encoder for transmitting the narrow band composite video signal over a transmission line from the encoder to the decoder.

8. A slow scan video conversion method for a wide band composite video signal including video portions for each line in each of a succession of frames comprising the steps of:

progressively sampling instantaneous amplitudes of the video portions representing different preselected image elements per frame, digitally timing the sampling at a fixed rate quantitized in time in discrete steps relative to the frequency of the wide band signal with a first sync generator for generating digital timing pulses quantitized in time in discrete steps to produce a narrow band composite video signal, serially storing the narrow band signal, digitally timing the storage at a fixed time rate correlated with the rate of the sampling by a second sync generator and in the same sequence as the sampling over a substantially longer time interval than the frame rate to assemble the sampled amplitudes representing image elements in their original sequence and delivering the sampled amplitudes from storage at the original wide band signal rate, and pulse width modulating the narrow band composite video signal prior to said serial storing.

9. A slow scan video conversion method for a wide band composite video signal including video portions for each line in each of a succession of frames comprising the steps of:

progressively sampling instantaneous amplitudes of the video portions representing different preselected image elements per frame, digitally timing the sampling at a fixed rate quantitized in time in discrete steps relative to the frequency of the wide band signal with a first sync generator for generating digital timing pulses quantitized in time in discrete steps to produce a narrow band composite video signal, serially storing the narrow band signal, digitally timing the storage at a fixed time rate correlzted with the rate of the sampling by a second sync generator and in the same sequence as the sampling over a substantially longer time interval than the frame rate to assemble the sampled amplitudes representing image elements in their original sequence and delivering the sampled amplitudes from storage at the original wide band signal rate, and pulse code modulating the narrow band composite video signal prior to said serial storing to convert from an essentially analog to a digital signal.

10. A digital slow scan conversion system for a wide band composite video signal generated by a television camera scanning the same stationary image wherein said composite video signal includes video signal portions for each line in each of a succession of frames, horizontal and vertical sync and blanking portions for each line and a vertical portion at the end of the last line, said system comprising:

a slow scan sync generator including means for generating digital timing pulses quantitized in time in discrete steps relative to the frequency of the wide band video signal and recurring at a preselected fixed rate, a digital encoder timed by the digital timing pulses including a sample-and-hold circuit for progressively matrix sampling instantaneous amplitudes of the video signal and having an amplitude proportioned to the amplitude of the video signal portion at the instant it is sampled, each said sampling pulse representing a different image element to form a narrow band composite video signal, said encoder including means for substituting a narrow band sync signal during the vertical interval in place of the sync and blanking pulses for each frame and adding a sampled audio signal at the leading and trailing ends of the narrow band video for each line of each frame, a second slow scan sync generator separate from the first-mentioned sync generator for generating digital timing pulses of the same discrete steps and fixed rate as the first sync generator, and a digital decoder timed by said digital timing pulses including a storage medium having a series of discrete cells for storing the sampling pulses on the storage medium at a rate correlated with the sampling rate, said sampling pulses being serially stored in the cells separated by substantially spaced intervals and filling the cells in the intervals during each successive frame so as to assemble the image elements in their original sequence, said decoder including means for replacing the narrow band sync pulses with the original horizontal and vertical sync and blanking pulses and means to strip out the sampled audio signal whereby to reproduce the original wide band composite video signal as the decoder is read out.

* * * * *

PO-1050
(5/69)

UNITED STATES PATENT OFFICE
CERTIFICATE OF CORRECTION

Patent No. 3,663,749 Dated 16 May 1972

Inventor(s) Cannon, Max R.

It is certified that error appears in the above-identified patent and that said Letters Patent are hereby corrected as shown below:

In the Claims:

Claim 1, line 6, cancel "for", and substitute -- coupled to --; line 18, after "generator" (second occurrence), insert -- for --.

Claim 2, line 6, after "means", insert -- coupled to --.

Claim 6, line 2, after "means", insert -- coupled to said encoder --.

Claim 7, line 2, cancel "coupled to said encoder".

Signed and sealed this 5th day of December 1972.

(SEAL)
Attest:

EDWARD M.FLETCHER,JR.
Attesting Officer

ROBERT GOTTSCHALK
Commissioner of Patents